United States Patent [19]

Hokkanen

[11] Patent Number: 5,752,165
[45] Date of Patent: May 12, 1998

[54] METHOD AND APPARATUS FOR COMPARING AVERAGES OF SIGNAL LEVELS OF RECEIVERS OF RECEIVER UNIT FOR AUTOMATICALLY PROVIDING INDICATION OF A DEFECTIVE RECEIVER

[75] Inventor: Petri Hokkanen, Oulu, Finland

[73] Assignee: Nokia Telecommunications Oy, Espoo, Finland

[21] Appl. No.: 615,224

[22] PCT Filed: Sep. 14, 1994

[86] PCT No.: PCT/FI94/00403

§ 371 Date: Jun. 4, 1996

§ 102(e) Date: Jun. 4, 1996

[87] PCT Pub. No.: WO95/08223

PCT Pub. Date: Mar. 23, 1995

[30] Foreign Application Priority Data

Sep. 15, 1993 [FI] Finland .................................. 934052

[51] Int. Cl.⁶ .................................................. H04B 17/00
[52] U.S. Cl. ...................... 455/67.1; 455/67.7; 455/134; 455/226.4
[58] Field of Search .......................... 455/67.1, 67.4, 455/67.7, 134, 135, 136, 140, 226.1, 226.2, 226.4, 53.1, 507, 517

[56] References Cited

U.S. PATENT DOCUMENTS

| | | |
|---|---|---|
| 4,255,816 | 3/1981 | Grunza et al. |
| 4,823,280 | 4/1989 | Mailandt et al. |
| 4,823,398 | 4/1989 | Hashimoto |
| 5,263,175 | 11/1993 | Dejmek |

FOREIGN PATENT DOCUMENTS

| | | |
|---|---|---|
| 0 398 710 | 11/1990 | European Pat. Off. |
| 0 454 368 | 10/1991 | European Pat. Off. |
| 0 454 585 | 10/1991 | European Pat. Off. |
| 0 500 326 | 8/1992 | European Pat. Off. |

OTHER PUBLICATIONS

Patent Abstracts of Japan, vol. 12, No. 7, E-571, Abstract of JP.A.62-165444 (NEC Corp), 22 Jul. 1987.

Primary Examiner—Reinhard J. Eisenzopf
Assistant Examiner—Thanh Le
Attorney, Agent, or Firm—IP Group of Pillsbury Madison & Sutro LLP

[57] ABSTRACT

For automatically monitoring to detect that a receiver of in a diversity receiver unit which includes at least two receivers having respective antennas, is operating deficiently, signal levels as received in a plurality of corresponding receptions by each receiver are averaged for each receiver, the averages are compared with one another, and, if the averages differ by more than a preselected limit, an indication of existence of malfunction is provided.

9 Claims, 1 Drawing Sheet

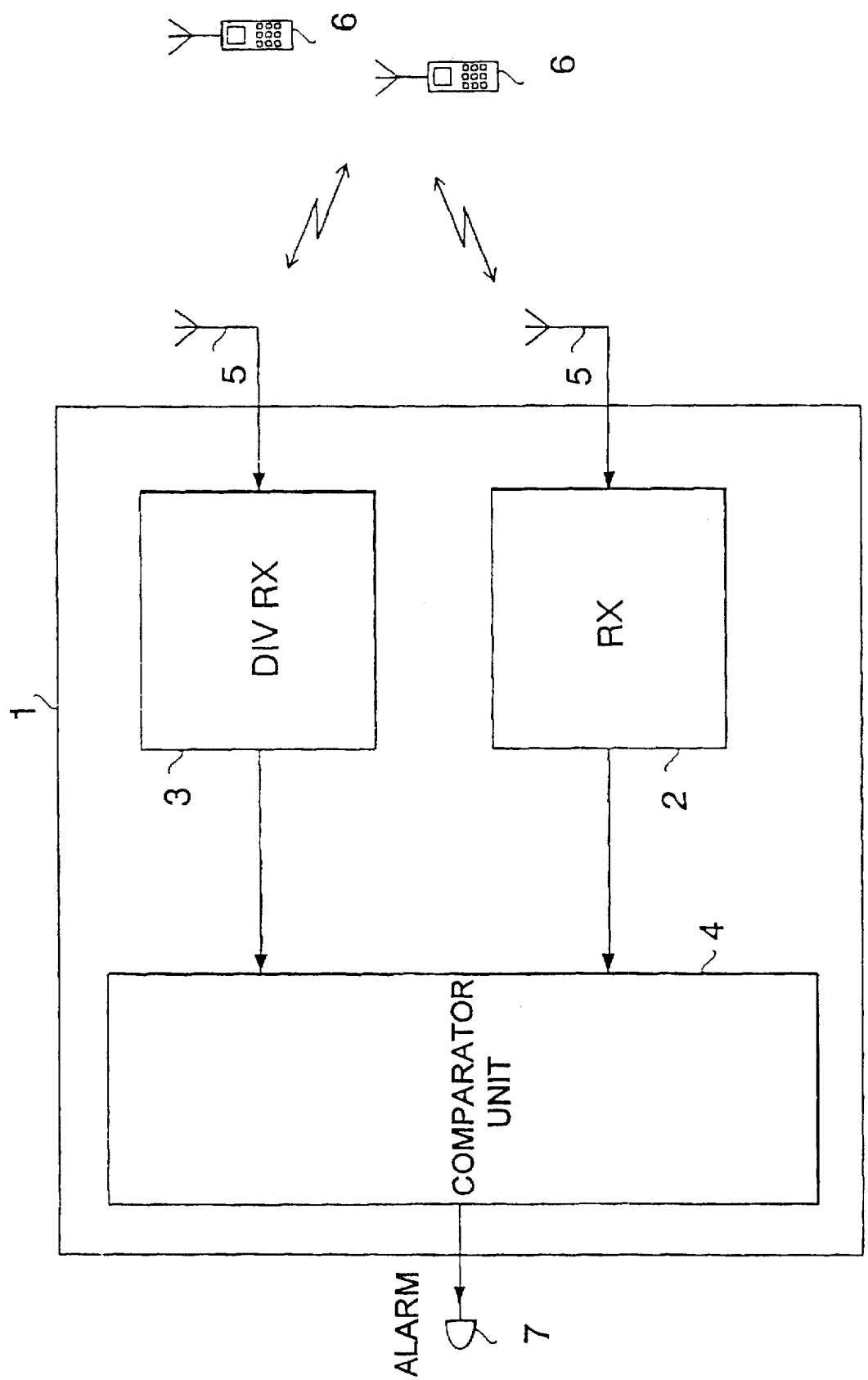

ical application PCT/FI94/00403, filed Sep. 14, 1994.

METHOD AND APPARATUS FOR COMPARING AVERAGES OF SIGNAL LEVELS OF RECEIVERS OF RECEIVER UNIT FOR AUTOMATICALLY PROVIDING INDICATION OF A DEFECTIVE RECEIVER

This application claims benefit of International application PCT/FI94/00403, filed Sep. 14, 1994.

BACKGROUND OF THE INVENTION

The invention relates to a method for testing the operation of a radio receiver unit during normal traffic, the receiver unit comprising at least two receivers for diversity reception, and at least two antenna means to allow the receiver unit to receive signals transmitted by a radio transmitter. The method includes the steps of measuring the signal level of the signals received by each receiver, and calculating an average on the basis of the measurements performed. The invention also relates to a receiver unit comprising at least two receivers for diversity reception, at least two antenna means to allow the receiver unit to receive signals transmitted by the radio transmitter, and measuring means for measuring the signal level of the signals received by each receiver and for calculating the average of the measured signal levels for each receiver.

The invention relates particularly to monitoring the operation of a receiver unit at a base station of a cellular radio system. In order that the service level can be kept as high as possible, it is extremely significant to a network operator of a cellular radio system that a damaged receiver is detected as soon as possible.

According to a known method for monitoring the operation of an antenna of a transceiver unit, a predetermined test signal is transmitted to the antenna of the receiver by a test transmitter provided at the receiver, whereafter the signal reflected to the receiver is measured. If the antenna of the receiver unit is damaged, the impedances of the cable and the antenna do not match.

According to another known method, the operation of a receiver unit is monitored by a specific mobile station provided at the base station. According to this method, the network operator makes a call to this mobile station, and the operation of the receiver unit can then be monitored by means of measurements.

The most significant drawback of the known solutions described above is that they are not suitable for continuous automatic monitoring of a receiver unit of a base station as according to them, the network operator must perform special test operations. As a damaged receiver unit is not detected automatically but only after special test operations, it may take rather a long time before a damaged receiver unit of a base station is detected. The receiver unit of the base station may thus be inoperative for rather a long time before the network operator is informed of the malfunction.

SUMMARY OF THE INVENTION

The object of the invention is to obviate the problems described above and to provide a method by which a malfunction in a receiver unit of a base station is detected more easily, rapidly and reliably than before. These objects are achieved with a method according to the invention, which is characterized by indicating an error when the difference between the averages calculated for the different receivers is greater than a predetermined reference value.

The invention also relates to a receiver unit which is characterized by comprising indicator means for indicating an error when the difference between the averages calculated is greater than a predetermined reference value.

The invention is based on the idea that a fault occurring in a receiver unit can be detected more reliably, easily and rapidly than before if the operation of the receiver unit is monitored continuously during its normal operation by comparing the signal levels (RSSI: Received Signal Strength Indicator) of the signals received by the different receivers of the unit. The average RSSI values of the signals received by the different receivers should be very close to each other when the receivers concerned operate normally. When the difference between the averages exceeds a predetermined limit value, an automatic alarm is given to the network operator. The most significant advantage of the method and receiver unit according to the invention is thus that the operation of the receiver unit can be monitored automatically and continuously during normal traffic, which enables the network operator to detect any malfunctions immediately.

Another significant advantage of the invention is that it can be applied to a base station of a radio system without any separate devices. This is possible as the steps of the method according to the invention are preferably performed by means of a computer program. Thus, even though the base station is able to monitor the operation of its receiver units during its normal operation, it hardly becomes more expensive.

According to a preferred embodiment of the invention, the average of the signal levels is calculated in such a way that signals transmitted by more than one radio transmitter are included in the calculation. It is thus possible to avoid a situation where the averages of the signal levels differ from one another because the intensity of the signals transmitted by a certain radio transmitter varies depending on by which antenna of the receiver unit they are received. This difference in intensity may be due to reflections, for example, and it has the most harmful effect when the radio transmitter is stationary. The reliability of the method of the invention thus increases with the number of radio transmitters included in the calculation of signal level averages. This is because it can be assumed that the intensity of signals transmitted by different radio transmitters is the same on the average at different antennas. This embodiment of the invention is at its most reliable when the averages of signal levels are calculated for signals transmitted by several mobile radio transmitters.

BRIEF DESCRIPTION OF THE DRAWING

In the following, the invention will be described more closely by means of a preferred embodiment and with reference to the accompanying drawing, which is a block diagram illustrating a receiver unit of a base station in a cellular radio system, such as the GSM system, to which the method of the invention can be applied.

DETAILED DESCRIPTION

The FIGURE shows a receiver unit 1 comprising antennas 5 and two receivers: a "normal" receiver 2, and a diversity receiver 3. During normal traffic, the receiver unit 1 receives radio signals by that receiver 2 or 3 where the signal level of the received signal is higher. The antennas 5 are usually mounted at a distance from each other so that the signal levels of the signals received by them are generally slightly different on account of reflections of the signals transmitted by the radio transmitter 6. The receiver unit 1 comprises means for measuring the signal levels (RSSI) of the signals received by the receivers 2 and 3. During normal traffic, the comparator unit 4 calculates the average of the signal levels of the received signals separately for each receiver. The interval for which the average is calculated is preferably as long as possible in order that the effect of occasional variations is minimized. In addition, the comparator unit 4 comprises means for comparing the averages calculated for the different receivers. If the difference between the averages exceeds a predetermined limit value, the comparator unit 4 indicates an alarm by a signal light 7. This alarm can naturally also be indicated in some other way, for instance by sending a message about it to the base station controller (not shown in the figure).

As signals transmitted by the same radio transmitter 6 may be received with different levels by the different antennas of the receiver unit 1, the average of the signal level is calculated for the receivers 2 and 3 preferably in such a manner that signals transmitted by more than one transmitter are included in the calculation. This helps to avoid a situation where the averages of the different signal levels differ from each other because the radio transmitter that has transmitted the signals is received better by one of the antennas 5. The reliability of the method according to the invention thus increases when the number of the radio transmitters 6 included in the calculation of the averages of signal levels increases, and when the radio transmitters 6 included in the calculation are mobile, as it can then be assumed that the radio transmitters 6 are received equally well on the average by the different antennas 5.

The above description and the accompanying drawing are intended merely to illustrate a preferred embodiment of the invention without limiting the invention. Thus the embodiments of the method and receiver unit of the invention can differ from the example described above within the scope of the appended claims.

I claim:

1. A method for testing the operation of a radio receiver unit during normal traffic, the receiver unit comprising at least two receivers for diversity reception, and respective antennas to allow the receiver unit to receive signals transmitted by at least one radio transmitter, said method comprising the steps of:

measuring the signal levels of the signals received by each receiver to provide respective measurements;

calculating for each receiver an average on the basis of the respective said measurements;

comparing said averages with one another to obtain differences; and indicating an error when a difference between the averages calculated for a respective at least two of the receivers is greater than a predetermined reference value.

2. A method according to claim 1, further including:

providing said receiver unit at a base station of a cellular radio system; and providing at least one said radio transmitter within a radio coverage area of said base station.

3. A method of according to claim 2 wherein:

said at least one radio transmitter includes at least two radio transmitters, so that the signal levels of signals transmitted by more than one radio transmitter are included in calculating said averages of said signal levels of said received signals.

4. A method of according to claim 1 wherein:

said at least one radio transmitter indicates at least two radio transmitters, so that the signal levels of signals transmitted by more than one radio transmitter are included in calculating said averages of said signal levels of said received signals.

5. A receiver unit, comprising:

at least one two receivers operatively connected to respective antennas and arranged for diversity reception; of signals transmitted by at least one radio transmitter measuring means for measuring the signal levels of the signals received by said receiver and for successively calculating for each said receiver averages of the measured signal levels;

means for comparing respective ones of said averages for at least two of said receivers with one another to obtain respective differences; and indicator means for indicating an error when a difference between respective ones of said averages is greater than a predetermined reference value.

6. A receiver unit according to claim 5, wherein:

said receiver unit is a receive unit at a base station of a cellular radio system, arranged to receive as said signals, signals from at least one mobile radio transmitter located within a radio coverage area of said base station.

7. A method for automatically detecting that a receiver malfunction has occurred in a radio receiver unit which includes at least two receivers operatively connected to respective antennas and arranged for diversity reception of signals transmitted from at least one radio transmitter, said method comprising:

(a) while said at least one radio transmitter is transmitting a signal for reception by each said radio receiver, calculating a succession of averages of received signal strength indicators separately for each said receiver to obtain respective averages;

(b) continuously comparing respective said averages for said at least two receivers, to obtain respective differences; and (c) automatically determining when a respective difference as obtained in step (b) exceeds a predetermined value, and then providing a corresponding indication by at least one of an alarm and a message to a controller.

8. A method according to claim 7, further including:

continuing to perform steps (a), (b) and (c) as at least another radio transmitter is transmitting a signal for reception by each said radio receiver, so that at least some of said averages are based on received signal strength indicators corresponding to signals received from transmissions by at least two radio transmitters.

9. A method according to claim 8, wherein:

at least one said radio transmitter is a mobile radio transmitter.

* * * * *